(12) United States Patent
Jain et al.

(10) Patent No.: US 9,720,467 B2
(45) Date of Patent: Aug. 1, 2017

(54) THERMAL MITIGATION ADAPTATION FOR A MOBILE ELECTRONIC DEVICE

(71) Applicant: QUALCOMM Incorporated, San Diego, CA (US)

(72) Inventors: Ankur Jain, San Diego, CA (US); Unnikrishnan Vadakkanmaruveedu, San Diego, CA (US); Vinay Mitter, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 851 days.

(21) Appl. No.: 13/963,248

(22) Filed: Aug. 9, 2013

(65) Prior Publication Data

US 2015/0043156 A1 Feb. 12, 2015

(51) Int. Cl.
G06F 1/20 (2006.01)
H04M 1/725 (2006.01)

(52) U.S. Cl.
CPC ........ *G06F 1/206* (2013.01); *H04M 1/72575* (2013.01); *G06F 2200/1633* (2013.01)

(58) Field of Classification Search
CPC ............ G06F 1/206; G06F 2200/1633; H04M 1/72575; H04M 1/0202
See application file for complete search history.

(56) References Cited

U.S. PATENT DOCUMENTS 6,760,649 B2 * 7/2004 Cohen ................ G05D 23/1928
700/299
8,031,466 B2 10/2011 Katoh et al.
(Continued)

FOREIGN PATENT DOCUMENTS

EP 2546722 A2 1/2013
EP 2804326 A1 11/2014
(Continued)

OTHER PUBLICATIONS

"Adaptive Thermal Management of a Mobile Computer Based on External Tactile Thermal Sensory Data", IP.com Journal, IP.com Inc., West Henrietta, NY, US, Sep. 21, 2009 (Sep. 21, 2009), XP013134412, ISSN: 1533-0001.
(Continued)

*Primary Examiner* — M. N. Von Buhr
(74) *Attorney, Agent, or Firm* — The Marbury Law Group, PLLC

(57) ABSTRACT

The various embodiments provide methods and systems for adjusting the thermal mitigation system of a mobile electronic device when an add-on outer casing is attached. The mobile electronic device determine whether an add-on outer case is attached to the mobile electronic device and change a thermal mitigation parameter of a thermal mitigation process implemented on the mobile electronic device in response. The determination may be via a sensor or a user input. A changed thermal mitigation parameter may be stored in memory, or input by a user or in a communication from the add-on case. The changed thermal mitigation parameter may be determined based on a particular make, model or properties of the add-on case, and/or may be obtained from a database stored in the device or accessed via a network. Removal of the case may be detected and the thermal mitigation parameter returned to an initial value.

36 Claims, 4 Drawing Sheets

(56) References Cited

U.S. PATENT DOCUMENTS

| | | | |
|---|---|---|---|
| 8,143,983 B1* | 3/2012 | Lauder | G06F 1/1626 24/303 |
| 8,145,926 B2* | 3/2012 | Park | G06F 1/203 165/287 |
| 8,315,746 B2 | 11/2012 | Cox et al. | |
| 8,355,248 B2 | 1/2013 | Nishi | |
| 8,392,340 B2* | 3/2013 | Cox | G06F 1/1677 706/12 |
| 8,554,389 B2* | 10/2013 | Cox | G06F 1/203 320/144 |
| 9,055,470 B2* | 6/2015 | Sahu | H04W 52/0261 |
| 9,116,677 B2* | 8/2015 | Jain | G06F 1/1632 |
| 2002/0152406 A1* | 10/2002 | Watts, Jr. | G06F 1/203 713/300 |
| 2004/0162697 A1* | 8/2004 | Smith | G06F 1/206 702/132 |
| 2006/0155424 A1* | 7/2006 | Katoh | G05D 23/1919 700/300 |
| 2009/0323275 A1 | 12/2009 | Rehmann et al. | |
| 2010/0233961 A1* | 9/2010 | Holden | G06F 13/385 455/41.3 |
| 2011/0301778 A1 | 12/2011 | Liang et al. | |
| 2012/0072167 A1 | 3/2012 | Cretella, Jr. et al. | |
| 2012/0241140 A1* | 9/2012 | MacDonald | G06F 1/206 165/278 |
| 2012/0254479 A1 | 10/2012 | Matsuoka | |
| 2012/0290748 A1* | 11/2012 | Crosby | G06F 1/1658 710/62 |
| 2012/0311357 A1 | 12/2012 | Andrews | |
| 2013/0090888 A1* | 4/2013 | Anderson | G06F 1/203 702/130 |
| 2014/0199952 A1* | 7/2014 | Sandhu | H03F 1/303 455/91 |
| 2014/0236380 A1* | 8/2014 | Alton | G06F 1/206 700/299 |
| 2014/0302893 A1* | 10/2014 | Dhavaloganathan | H04M 1/72577 455/566 |
| 2014/0361081 A1* | 12/2014 | Glanzer | G06K 7/082 235/449 |
| 2015/0000889 A1* | 1/2015 | Bellamkonda | G01K 7/42 165/287 |
| 2015/0031326 A1* | 1/2015 | Begin | H04W 24/08 455/405 |

FOREIGN PATENT DOCUMENTS

| | | |
|---|---|---|
| GB | 2482931 A | 2/2012 |
| WO | 2009143487 A2 | 11/2009 |

OTHER PUBLICATIONS

International Search Report and Written Opinion—PCT/US2014/050419—ISA/EPO—Nov. 11, 2014.

* cited by examiner

THERMAL MITIGATION ADAPTATION FOR A MOBILE ELECTRONIC DEVICE

BACKGROUND

Contemporary mobile electronic devices, such as smartphones, tablets and laptop computers, include on-board systems that may generate a significant amount of heat. One or more components within the mobile electronic device housing emitting heat may create a region on an outer surface of the mobile electronic device housing where the temperature is highest. Such a region is referred to as a "hot spot" and is commonly found on a back cover of many mobile electronic devices. If such a hot spot were allowed to get too hot, it could cause harm or discomfort to a user. Thus, many mobile electronic devices include thermal mitigation systems that control and/or limit the amount of heat the mobile electronic device is allowed to generate, such as by limiting the power level of the mobile electronic device. For example, a system on chip (SoC) of the mobile electronic device may be monitored and its operation limited if a designated outer surface hot spot temperature exceeds a predetermined limit. Thus, the thermal mitigation system may prevent the outer surfaces of the mobile electronic device housing from becoming uncomfortable to a user's touch. Such systems generally either power down or limit a component, such as a processor, in some way in an attempt to ensure the hot spots to not reach or exceed the temperature threshold. Controlling components in this way is generally acceptable because it ensures user safety and comfort, in spite of the fact that it may also reduce system performance.

SUMMARY

The various embodiments include methods, systems and devices for thermal mitigation adaptation for a mobile electronic device to account for the presence of a case on the exterior of the mobile electronic device. The methods include determining whether an add-on outer case is attached to the mobile electronic device, and changing a thermal mitigation parameter in the device's thermal management or thermal mitigation algorithm/process in response to determining that an add-on outer case is attached. By changing a thermal mitigation parameter in a thermal management or thermal mitigation algorithm/process, the device processor may be allowed to run at higher power level than would be possible safely without the case since the case provides a degree of thermal insulation that maintains the exterior temperature at a lower level for a given interior temperature. Also, the insulating effect of a case delays the rise in temperature of the exterior of the case during transient conditions, enabling the processor to operate at higher peak power levels without risking injury to a user.

Further embodiments may include a mobile electronic device having a processor configured with processor-executable software instructions to perform various operations corresponding to the methods discussed above.

Further embodiments may include a mobile electronic device having various means for performing functions corresponding to the method operations discussed above.

Further embodiments may include a non-transitory processor-readable storage medium having stored thereon processor-executable instructions configured to cause a processor of a mobile electronic device to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
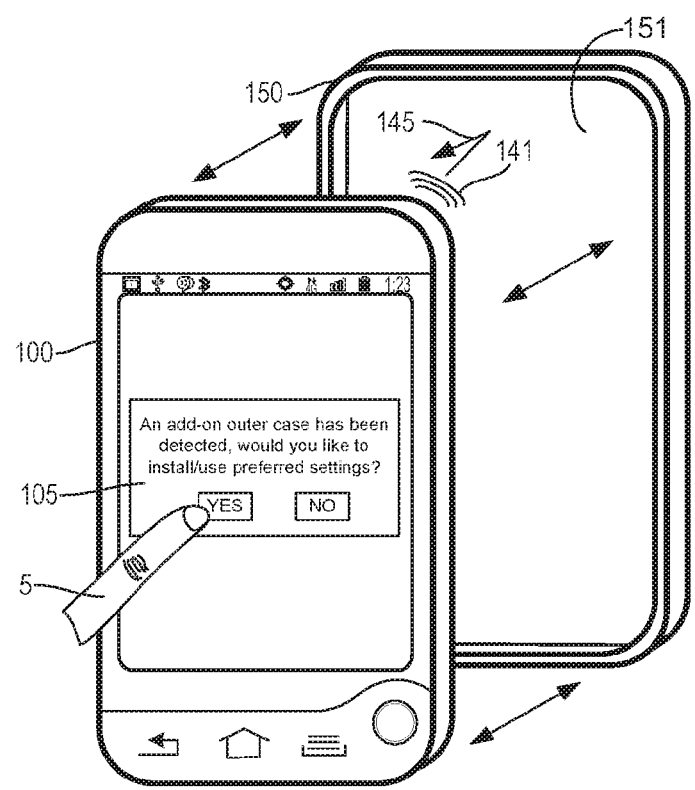
FIG. 1 is a mobile electronic device and an add-on outer case suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile electronic device" or "mobile electronic device" are used interchangeably to refer to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices that include a programmable processor, memory and circuitry for establishing wireless communication pathways and transmitting/receiving data via wireless communication pathways to mobile communication networks.

The following descriptions of the embodiments refer to add-on outer cases that are removably secured to and cover the permanent outer housing of mobile electronic devices. As used herein, the term "permanent outer housing" refers to an outer casing that encloses and protects a mobile electronic device and for which a default thermal mitigation parameter is designed to operate. Although the permanent outer housing may be removed for repair or replacement over the operative life of the mobile electronic device, such removal may require special skills/tools and is rarely performed. The mobile electronic device is not intended for normal operation without the permanent outer housing. In contrast, the term "add-on outer case" as used herein refers to a removably secured add-on outer case that is optional. In other word, the mobile electronic device is intended for normal operation with or without the add-on outer case, which is relatively easily removed particularly as compared to the permanent outer housing. An add-on outer case is considered to be "attached to the mobile electronic device," when it is mounted thereon and removably secured as intended for the mobile electronic device.

The various embodiments provide a method for managing thermal conditions in a mobile electronic device, as well as methods and systems for adjusting the thermal mitigation system of a mobile electronic device in response to detecting the presence or absence of an add-on outer casing. The presence of an add-on outer case means such a case is covering a portion of the permanent outer housing of the mobile electronic device. Thermal mitigation systems/processes generally control a power level of the mobile electronic device in order to maintain external (as well as internal) temperatures within specified limits. Temperature limits on the exterior of a mobile electronic device are typically set to avoid causing discomfort or injury to a user (i.e., to avoid burning the user). Interior temperature limits may also be set to avoid operating components above their temperature tolerances.

Thermal mitigation systems/processes may adjust device operating power levels (e.g., processor frequency or voltage levels) based on temperature readings in particular regions and/or of component of the mobile electronic device. The term "thermal mitigation parameters" is used herein to refer to a threshold, trigger level, or comparative value used in a thermal mitigation system or process to determine whether a mitigation action is required. For example, the thermal mitigation parameter may be a temperature limit that a component or region of the mobile electronic device is allowed to reach before actions are taken to avoid that temperature increasing further. As another example, the thermal mitigation parameter may be a digital value output by a temperature sensor (e.g., a thermister) that corresponds to a maximum temperature (i.e., it may be a raw temperature sensor signal). In general, thermal mitigation systems or processes receive one or more temperature inputs and initiate an action to manage or mitigate thermal conditions when the temperatures reach or exceed one or more thermal mitigation parameters. In conventional mobile electronic devices, thermal mitigation parameters are fixed values or constants established during the design and testing of the device, and cannot take into consideration actual thermal conduction conditions outside the permanent outer housing.

The various embodiments adjust the thermal mitigation system or process by changing a thermal mitigation parameter in response to determining that an add-on outer case has been placed on the permanent outer housing. By changing a thermal mitigation parameter in a thermal mitigation system/process, the mobile electronic device processor may be allowed to run at higher power levels with a case attached without burning a user than would be possible without the case. This is possible because the case adds a layer of thermal insulation that will act to maintain the exterior temperature of the case at a lower level for a given interior temperature. In other words, for a given external maximum temperature the thermal insulation of the add-on case will enable the interior temperature to be higher than when there is no case attached. Also, the insulating and heat capacity effects of an add-on external case can delay the rise in temperature of the exterior of the case during transient conditions, enabling the processor to operate at higher peak power levels without risking injury to a user that is permissible without the case attached.

FIG. 1 illustrates a mobile electronic device 100, in the form of a smartphone, and an add-on outer case 150 aligned to be installed to cover the back panel of the permanent outer housing of the mobile electronic device 100. The use of add-on outer cases for mobile electronics is very common to protect such devices from impacts or to change their look/feel. Also, most contemporary add-on outer casings are thermal insulators (i.e., made from materials with low thermal conductivity, e.g., plastic). Thus, installing such an add-on outer case on the permanent outer housing of a mobile electronic device will change the heat conduction properties of the device. As a result, the temperature on the outer surface of the add-on outer case will be lower for a given internal temperature than on the outer surface of the permanent external housing 130. Also, due to thermal lag in the transmission of heat through the case, the temperature on the outer surface of the add-on outer case may be much lower during peak power when the power levels (i.e., processing demands) are fluctuating as is typical in most mobile electronic devices, provided the average power level is within what would be acceptable on a naked mobile electronic device (i.e., without an add-on outer case).

Figure 2:
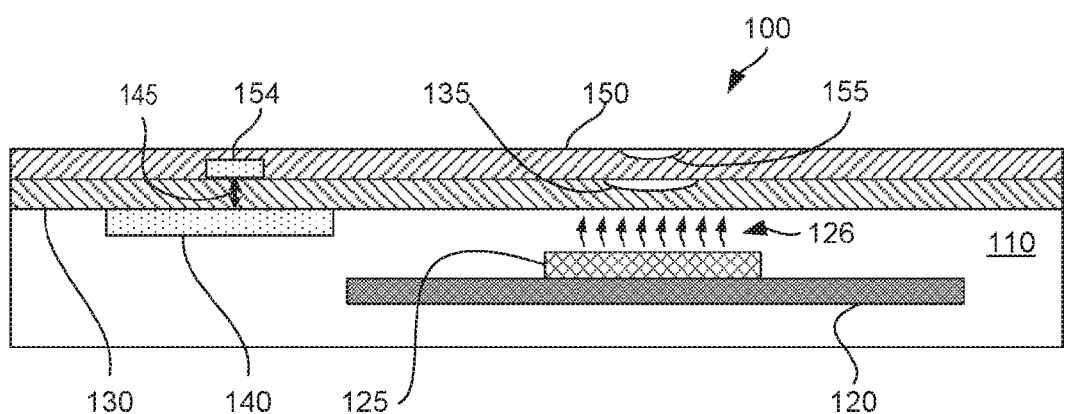
FIG. 2 is a schematic representation of a cross-sectional side view of a mobile electronic device with an add-on outer case installed thereon suitable for use with the various embodiments.

FIG. 2 is a schematic representation of a cross-sectional side view of a mobile electronic device 100 with an add-on outer case 150 installed thereon. The body 110 of the mobile electronic device 100 may include various components, such as a printed circuit board 120, a processor 125, and a sensor 140. Those various components are maintained within a permanent external housing 130 that is considered integral to the mobile electronic device 100 itself. In contrast, the add-on outer case 150 may be removably secured to the mobile electronic device 100 and easily interchanged with a different add-on outer case or not used at all.

FIG. 2 also shows heat 126 being emitted by the processor 125 that generates a hot spot 135 on the permanent housing 130. The hot spot 135 represents a region of peak temperatures on the outer surface of the original mobile electronic device 100. Without the add-on outer case 150, a user may contact the hot spot 135 when holding the device. For this reason thermal mitigation system are typically configured to take actions (e.g., reducing operating power when necessary) to ensure that the hot spot 135 temperature does not exceed a comfort and/or safety threshold temperature. The insulation provided by the add-on outer case 150 means a new outer hotspot 155 will not be as hot and/or as large as the hot spot 135 for a given temperature of the internal components. Thus, in accordance with an embodiment the mobile electronic device 100 may be allowed to generate higher internal temperatures until the new hotspot 155 is as hot or as large as the predetermined hotspot 135 without causing harm or discomfort to a user.

By allowing the device to operate at higher internal temperatures, the reductions in system performance associated with normal limits from the thermal mitigation system may be avoided. In other words, the embodiments leverage the thermal insulation provided by the extra outer case to enable the mobile electronic device to operate at a higher power level than would be possible without the case attached while keeping the outermost surface temperatures within the limits of personal comfort and safety.

Also, since there are so many styles and types of add-on outer cases, the thermal mitigation system may be provided with additional details to accommodate the particular add-on case or category of add-on case that is being used.

The thermal mitigation parameter within the thermal mitigation algorithm or process may be a numeric value used in the algorithm/process to determine when to limit operating power in order to maintain temperatures within an acceptable range. One example of a thermal mitigation parameter is a predetermined temperature limit that one or more regions of the permanent housing of the mobile electronic device are allowed to reach. If the temperature in that one or more region reaches the predetermined temperature limit, the thermal mitigation system will take action to prevent further temperature increases above that limit. Such temperature measurements may be made on the permanent housing (e.g., by a thermister coupled to the interior of the house which would be a direct measure of its temperature), on a structure conducting or radiating heat towards the housing (e.g., on cooling fins of a processor chip), on a circuit board supporting heat generating chips, or on the processor chip itself (e.g., by a thermister coupled to the top of the chip). Designers can model the heat conduction through the structures of the device and the permanent housing to estimate maximum external temperatures based on such internally measured temperatures. Thus, while the true external surface temperature of the permanent housing may not be measured, temperatures at one or more locations within the device may be used by a thermal mitigation system to determine when the power level of a heat generating component must limited or reduced to reduce its heat output. Whether measured directly with an outer surface sensor or indirectly by a remote sensor (i.e., an estimated hotspot temperature), a particular temperature limit may be designated as a thermal limit for the thermal mitigation system.

Also, the thermal mitigation parameter need not be an actual temperature value, and instead may be a value that can be compared to a measured or calculated value that correlates to a temperature. For example, the thermal mitigation parameter may be a resistance value that can be compared to resistance measured by a thermister, thereby obviating the need to convert the thermister output into temperature units. As another example, the thermal mitigation parameter may be a digital value (e.g., one byte of information) that can be compared to an output by a temperature measuring circuit that is not in units of temperature. For ease of reference, the term "thermal mitigation parameter" is used in the descriptions and the claims to refer to the factor used in the thermal mitigation algorithm or process that is adjusted to enable higher internal operating temperatures regardless of type or units of the value.

Another example of a thermal mitigation parameter is a power consumption limit, which may be used as a trigger. In this way, once one or more components reach the designated level of power consumption the thermal mitigation system may take actions to reduce the heat generated by the mobile electronic device or one or more particular components of the mobile electronic device.

By adjusting a thermal mitigation parameter to a higher value, the algorithm controlling the thermal mitigation algorithm/process will allow the mobile electronic device to operate at higher power levels for a given internal temperature. In turn, operating at higher power levels may improve system performance and a user experience when processor speed is required or most desired (e.g., when playing a video game on the mobile electronic device). Also, the embodiments may help to avoid imposing a performance reduction (e.g., reducing peak processing power) on a mobile electronic device when a case is attached, thereby improving the user experience.

In the various embodiments there are several ways that the mobile electronic device may determine that an add-on outer case has been installed. For example, a user of the mobile electronic device may input information into a user interface indicating an add-on outer case has been installed. Such user inputs may be entered as part of a setup routine or configuration app accessible by the user and/or in response to a prompt for input initiated by the device. In addition to indicating whether an add-on case is installed, the user input may also provide the device with additional information regarding the case (herein referred to as "case information") to enable the device to pick a proper new thermal mitigation parameter to use in the thermal mitigation algorithm/process. Such case information may include, for example, a case model number, model name, manufacturer name, serial number, a case description, a case design, a case identifier or other ID, and/or case thermal property information, such as a case thermal insulation factor, a case heat capacity, a specified thermal mitigation parameter, etc. that may be provided by the case manufacturer. In an embodiment, the case manufacturer and the mobile electronic device manufacturer may collaborate to provide the actual thermal mitigation parameter to be implemented as part of the case information. In this way, the user may provide identification information regarding the add-on outer case that may be used to lookup an appropriate thermal mitigation parameter (or directly used when the thermal mitigation parameter is included in the case information) to use in the thermal mitigation algorithm/process for the mobile electronic device. As noted below, the case information may then be used by a processor of the mobile electronic device to look up an appropriate thermal mitigation parameter, such as in an installed database or in a remote database via the Internet or an available network communication link.

In an embodiment, the mobile electronic device may also or alternatively be configured to automatically detect whether a case has been installed. Many smart phones have sensors, such as a proximity sensor used to detect when the phone is near a person's face, face-down on a surface or inside a pocket or bag. Proximity sensors may also be used to detect when an add-on case has been installed on the mobile electronic device. For example, FIG. 1 illustrates a pulse 141 from a proximity sensor deflecting off an inner surface 151 of the add-on outer case 150, so the mobile electronic device receives a signal 145 indicating the presence of the case 150. In this way, when the presence of a case may be automatically detected, so that the thermal mitigation algorithm may be adjusted as described herein. Other examples of a case sensor that may be built into a mobile electronic device include a button or switch that is depressed when the case is installed, electronic contacts that are engaged by contacts on the case, short ranger radio frequency (RF) sensors or transceivers (e.g., an NFC (near-field communication) or RFID transceiver), a microphone or camera if affected by the case, electrical sensors (e.g., inductance or capacitance sensors) that can detect changes in external electrical properties, and a magnetic sensor (e.g., a reed switch) that can detect a magnet included in the case.

The various proximity sensors that may be used to detect the presence of an add-on case may exploit a variety of phenomenon. A button or switch sensor may work by opening or closing an electrical circuit when direct or indirect contact is made with the add-on case. An optical sensor may use light, such as infrared light, transmitted by the proximity sensor and a photo-detector on the proximity sensor that detects any reflections. Acoustic proximity sensors may operating similar in principle to infrared models, but use sound instead of light, by emitting inaudible sound from a transducer, receiving reflected sound in the transducer (or another transducer) and measuring the round trip time of echoes. Capacitive proximity sensors sense distance to objects by detecting changes in capacitance of the device, as may be determined based on changes in frequency of radio frequency oscillations through the capacitor. Inductive proximity sensors sense distance to objects by generating oscillating magnetic fields and measuring current through a coil to detect changes in the induced current due to changes in the surroundings affecting the local inductance. Also, regardless of the technology used, a proximity sensor may be configured to differentiate between an add-on case and objects temporarily placed in immediate proximity to the mobile electronic device. For example, a user's hand, the inside of a pocket or a surface on which the mobile electronic device is temporarily set to rest may be distinguished from an add-on case by measuring a continuous duration the sensor detects the presence of the object. A time threshold, such as twenty four (24) hours, may provide reassurance that the detected object is an add-on case and not a temporary object place in next to the mobile electronic device. Thus, in response to a continuous duration of the presence of the adjacent object exceeding the time threshold, that object may be assumed to be an add-on case.

Additionally, the add-on outer case may connect electrically or wirelessly with the mobile electronic device when it is attached. An example of this embodiment is illustrated FIG. 2 which shows the add-on outer case 150 equipped with a communication circuit 145 configured to send signals to the mobile electronic device 100. An example of a wired connection is a plug or socket configured to engage a corresponding socket or plug in the mobile electronic device. For example, the add-on case may include an external battery for extending the battery life of the combination, so the presence of the add-on case may be recognized by the connection to that battery.

Examples of wireless connections include a radio frequency identification (RFID) system and a near field communication (NFC) wireless link. The communication 145 link illustrated in FIG. 2 represents a wireless connection between an RFID tag 154 in the add-on outer case 150 and an RFID reader/detector 140 in the mobile electronic device 100. RFID tags are relatively small and inexpensive and so can be incorporated on or in the add-on outer case 150. NFC is a set of standards for smartphones and similar devices to establish radio communication by touching NFC devices together or bringing them into close proximity, usually no more than a few centimeters. In this way, NFC enables contactless transactions, data exchange, and simplified setup of more complex communications. To communicate, only one of the NFC devices need be powered. In this way, the tag in the add-on case may be an unpowered NFC chip affixed to or incorporated into the add-on outer case 150 in order to maintain costs low for such add-on cases. Establishing communication 145 between the add-on outer case and the mobile electronic device will inform the device processor that an add-on case has been installed. When such communications are established, the processor may also prompt the user to confirm that an add-on outer case has in fact been installed and, in an embodiment, input case information.

When the add-on outer case includes a communication circuit configured to transmit information about the add-on outer case to the mobile electronic device, such as an RFID tag or NFC wireless link, that link may be used to communicate case information, such as a case model number, model name, manufacturer name, or even more specific information such as a thermal insulation factor (which specific information may be provided by either the case manufacturer or the mobile electronic device manufacturer). This configuration would enable the case to inform the thermal mitigation system for the mobile electronic device of its update value, thermal properties, make/model information, identification information or other information used for updating the currently used thermal mitigation parameter. Thus, the communication between the add-on outer case and the mobile electronic device may provide identification information regarding the add-on outer case that may be used to lookup an appropriate thermal mitigation parameter to use for the mobile electronic device.

Additionally, once the mobile electronic device obtains or has been provided with identification information regarding the add-on outer case, the mobile electronic device may be configured to automatically transmit a query through a linked communication network to a remote database (e.g., a server accessed via the Internet) regarding the thermal mitigation parameter that should be implemented.

While a case sensor as described above may be used to detect the presence of an add-on outer case, such sensors may not provide more specific information about the case, such as its thermal properties. Therefore, the mobile electronic device may be configured or provisioned with one or more thermal mitigation parameters stored in a memory to implement when the device determines that an add-on outer case is installed. Such stored thermal mitigation parameters may include a baseline thermal mitigation parameter value to be implemented when no case is installed, a default thermal mitigation parameter value to be implemented when a case of unknown characteristics is installed, and a number of different thermal mitigation parameter values correlated to case information in a data table that a processor of the device can look up using received case information (e.g., from a user input or communicated from the case).

By way of example with reference to FIG. 1, a user 5 may interact with a screen prompt 105 of the mobile electronic device 100 regarding an add-on outer case to confirm that an add-on outer case 150 is installed. This user input may be provided in response to a user-interface prompt generated by the mobile electronic device 100 upon detecting the presence of a case by a sensor. Also, additional screen prompts may be used to elicit from the user input of case information (examples of which are listed above) regarding the add-on outer case. If the user provides an input of case information, or case information is communicated by the case via some communication link, a processor of the mobile electronic device 100 may use that information to adjust the thermal mitigation parameter, such as by calculating a new thermal mitigation parameter, using the case information to look up a new thermal mitigation parameter in a data table or database, or using a thermal mitigation parameter value provided in the case information. Otherwise, if case information is provided regarding the particular add-on outer case, a default (i.e., "one-size-fits-all" thermal mitigation parameter value may be used. Such a default thermal mitigation parameter may be a value that is determined by the mobile electronic device manufacturer to be conservative enough to encompass the thermal insulation characteristics of any type of case that may fit on the device.

When the mobile electronic device determines that an add-on outer case is installed on or has been removed from the mobile electronic device, a currently set value of the thermal mitigation parameter used in the thermal mitigation algorithm may be changed to a new thermal mitigation parameter. In this way, the thermal mitigation parameter is changed to a new value reflective of the update value. One value of the thermal mitigation parameter may be the default value. The default value may be a value automatically used by the thermal mitigation system in the absence of an alternative. The default value may correspond to the initial factory settings that are configured to work with a naked mobile electronic device (i.e., without an add-on cover). Another value of the thermal mitigation parameter may be a single one-size-fits-all alternative to the default value, which may be used when any add-on outer case is attached to the mobile electronic device. Such a single one-size-fits-all alternative value may be a value included in the algorithm and/or stored in ROM). Additionally, the value of the thermal mitigation parameter may be a select value more particularly suited to the add-on outer case being used or a category of add-on outer cases. Such a select value may be determined from user input, as described above. As an example, a user may be prompted for information regarding the add-on casing, such as identification information for the particular case, which may be used in conjunction with a look-up table to find a select update value for the thermal mitigation parameter. Alternatively, the user input may provide a specific update value corresponding to the particular add-on outer case being used. Thus, case manufacturers may be motivated to make cases with greater insulating characteristics, which may be reflected in an update value for the thermal mitigation parameter printed on the case a user may input into their mobile electronic device. Otherwise, manufactures may make such update values or other case specific properties available to the public, such as through a website.

Figure 3:
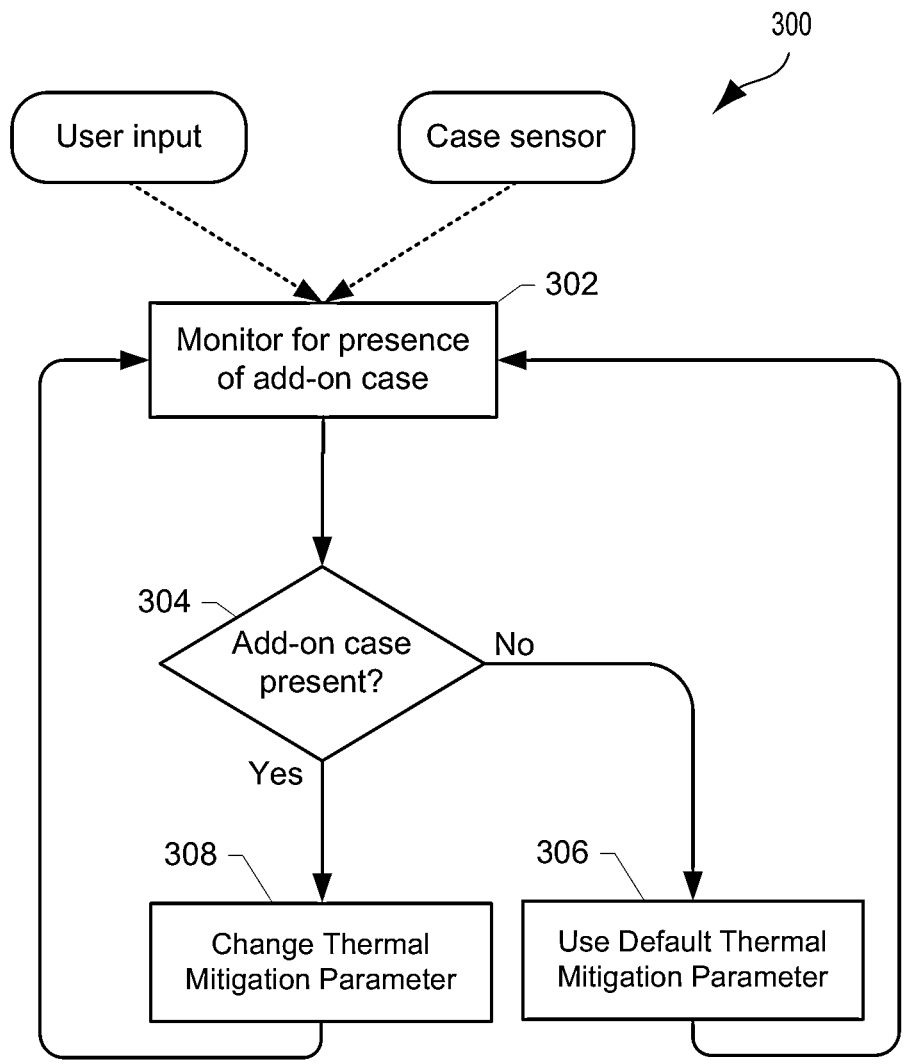
FIG. 3 is a process flow diagram illustrating an embodiment method of thermal mitigation for a mobile electronic device.

FIG. 3 illustrates an embodiment method 300 for adjusting a thermal mitigation process or algorithm to account for the presence of an add-on case on a mobile electronic device. Method 300 may be implemented within a processor of the mobile electronic device, such as a processor executing the thermal mitigation process or algorithm. In block 302, the processor executing the method 300 may monitor for the presence of an add-on case attached to the mobile electronic device. This may be accomplished by monitoring for a user input and/or monitoring signals of a sensor that can detect the presence of an add-on case automatically.

In embodiments in which the presence of an add-on cases determine from user input, the user may indicate that a case is attached to the mobile electronic device via a response to a user interface menu option, such as a device configuration menu. In an embodiment, the user may not only indicate that a case has been attached to the mobile electronic device, but input case identification information, such as a make and/or model of the case, a particular design of the case, or a model number or serial number (or similar unique identifier) of the case. Alternatively or in addition, the manufacturer of the case may provide information that the user can input identifying the thermal characteristics or thermal insulation properties of the case, or even a thermal mitigation parameter that should be implemented by the thermal mitigation process or algorithm.

In other embodiments, the presence of an add-on case may be determined automatically, such as by a case sensor. A number of different types of mechanisms and sensors may be used to detect the presence of the case, including proximity sensors, contact switches, audio sensor, optical sensors, and radio frequency (RF) devices. In an embodiment, the proximity sensor that is included in many smart phones for detecting when a user brings the device to his or her face (such as to enable powering down the display when the user is talking on the phone) may also be used to detect when a case has been attached to the device. Thus, the information provided by a proximity sensor may be leveraged to also determine when an add-on case has been attached to the mobile electronic device. In an embodiment, a mobile electronic device may include one or more contact switches, such as the preferable buttons or electrical contacts, which are configured to be activated (e.g., depressed or closed) when an add-on case is attached. In another embodiment, information received from audio or optical sensors (e.g., a microphone, light meter and/or camera) there are normal part of the mobile electronic device may be leveraged to detect when an add-on case is attached. For example, the presence of an add-on case may change acoustic properties of the device's microphone. Similarly, the presence of an add-on case may be detected by a camera on the device (e.g., around a periphery of the field of view). In a further embodiment, a radio frequency ID (RFID) transceiver within the mobile electronic device may query and receive information from an RFID chip included within the case by the case manufacturer. Such an RFID chip may communicate only the presence of the case, but information about the case that can be used to adjust the thermal mitigation parameter. Similar to information that may be received by a user input, such information may include a make/model of the case, a type or design of the case, thermal characteristics or thermal insulation value of the case, or a specified thermal mitigation parameter that should be used by the thermal mitigation algorithm or process.

In determination block 304 the processor may determine whether an add-on case is present on the mobile electronic device based upon the results of the monitoring in block 302. If the processor determines that an add-on case is not present on the mobile electronic device (i.e., determination block 304="no"), the processor may continue to implement the thermal mitigation algorithm or process using the standard or original value for the thermal mitigation parameter. In other words, when no cases present, the thermal mitigation algorithm or process may use the thermal mitigation parameter appropriate for an uncovered external housing.

If the processor determines that an add-on case is present on the mobile electronic device (i.e., determination block 304="Yes"), the processor may change the thermal mitigation parameter used in the thermal mitigation algorithm process to account for the presence of the case. In an embodiment, the thermal mitigation parameter may be changed to a value stored in memory that is used for all cases regardless of model. In another embodiment, information regarding the particular installed case, as may be received from a user input or automatically (e.g., an RFID signal), may be used to determine a suitable new thermal mitigation parameter to implement. For example, based on a case make/model, serial number, or type, the processor may perform a table lookup to obtain an appropriate thermal mitigation parameter from a database of such parameters stored in memory. As another example, the processor may use thermal characteristics regarding the case received by a user or automatic input in order to calculate a suitable thermal mitigation parameter. As a further example, the case may specify the thermal mitigation parameter that should be used, and that value received by a user input or by automatic means (e.g., an RFID signal) may be directly implemented in the thermal mitigation algorithm or process.

The processor may continue to implement the operations of method 300 on a continuous basis so that when a case is installed the thermal mitigation parameter is adjusted accordingly, and when the cases removed, the thermal mitigation algorithm or process returns to the standard (i.e., case-less) or original value for the thermal mitigation parameter.

Figure 4:
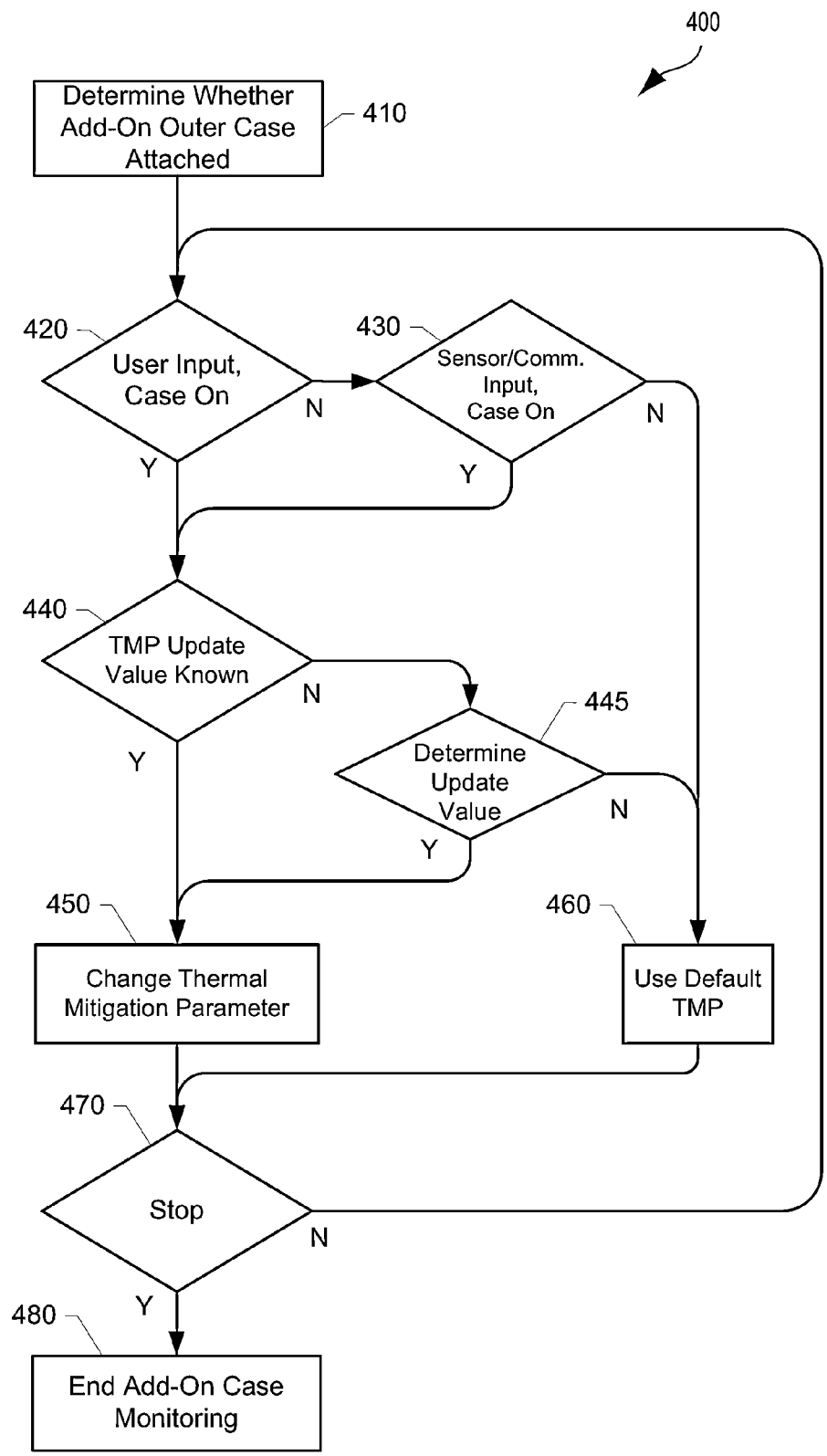
FIG. 4 is a process flow diagram illustrating another embodiment method of thermal mitigation for a mobile electronic device.

FIG. 4 illustrates another embodiment thermal mitigation method 400 for a mobile electronic device. The method 400 represented by the process flow particularly pertains to a dynamic method of altering a thermal mitigation system for a mobile electronic device. The process flow includes scenarios in which determinations regarding whether to change the thermal mitigation parameter and what update value to use if such a change is made.

In block 410, a determination may be initiated by a processor of the mobile electronic device (such as a processor executing the thermal mitigation process) as to whether an add-on outer case is attached to the mobile electronic device. As described above, the add-on outer case in question is one that is removably secured to and covers a permanent outer housing of the mobile electronic device. In block 420 a determination may be made as to whether a user input has been received indicating the add-on outer case is attached to the mobile electronic device. If no user input indicating the add-on outer case is attached has been received or the user input indicates the add-on outer case is not attached (i.e., determination block 420="No"), in block 430 a determination may be made as to whether either a sensor has detected the presence of an add-on outer case or the case presence was determined from a communication received from the add-on outer case itself. A sensor, such as a proximity sensor, may detect the presence of an object in contact with the permanent outer housing of the mobile electronic device and provide input accordingly. The presence of that object may be an indication that an add-on outer case has been installed on the mobile electronic device (i.e., "Case On"). Also, a communication may be received from the add-on outer case through a wired or wireless communication link and thus similarly provide input accordingly. Such a communication may indicate whether the add-on outer case is attached to the mobile electronic device (i.e., "Case On"). If no input is received from a sensor or a communication indicating an add-on outer case is attached (i.e., determination block 430="No"), in block 460 a default value may be used for the thermal mitigation parameter (TMP).

In block 420, if a user input indicates the add-on outer case is attached to the mobile electronic device (i.e., determination block 420="Yes"), in block 440 a determination may be made as to whether an update value is known for the TMP. Similarly, in block 430 if input from a sensor or a communication indicates the add-on outer case is attached to the mobile electronic device (i.e., determination block 430="Yes"), in block 440 a determination may be made as to whether an update value is known for the TMP. The update value may be known because it is stored in memory or otherwise previously input. If the update value for the TMP is not known for the thermal mitigation parameter (i.e., determination block 440="No"), in block 445 a determination may be made as to what that update value may be determined. The update value may be determined from an external source such as user input, a communication from the add-on outer case, network communication or other remote source. If no update value may be determined (i.e., determination block 445="No"), then in block 460 a default value may be used for the TMP.

In block 440, if the update value for the TMP is known (i.e., determination block 440="Yes") the TMP may be changed accordingly in block 450. Similarly, if the update value for the TMP may be determined (i.e., determination block 445="Yes") the TMP may be changed accordingly in block 450.

Once either the TMP has been changed in block 450 or the default TMP used in block 460, a determination may be made at 470 as to whether the process flow should stop. If further determinations need to be made regarding whether the add-on outer case is attached, the process flow may return to the determining block 420 or alternatively determining block 430. In the process flow described above and shown in FIG. 4, the blocks 420 and 430 may be switched or even occur simultaneously. If no further determinations need to be made regarding whether the add-on outer case is attached, the process flow, representing the add-on case monitoring, may stop in block 480.

Figure 5:
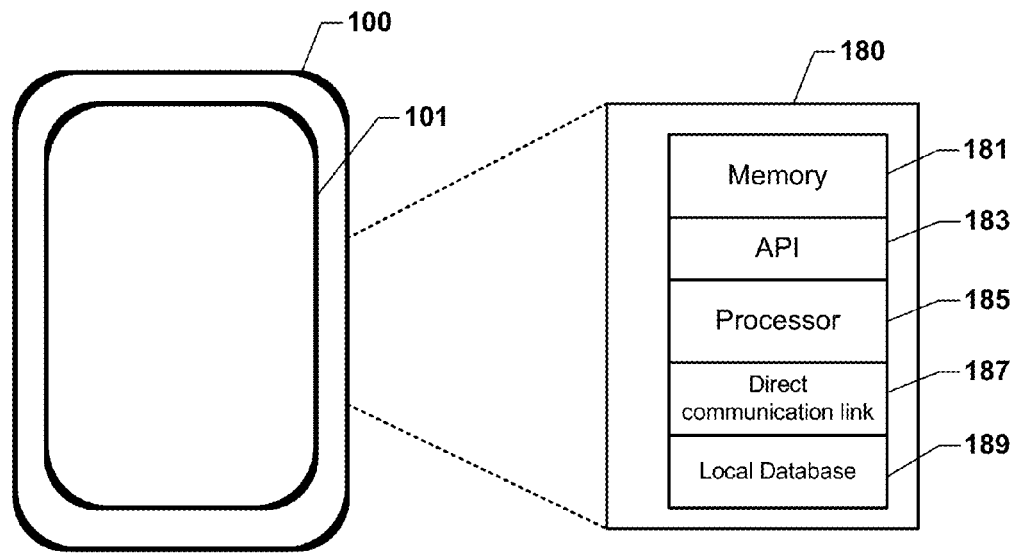
FIG. 5 is a schematic block diagram illustrating a mobile electronic device suitable for various embodiments.

FIG. 5 illustrates a schematic representation of a mobile electronic device 100 usable in the various embodiments. In various embodiments, the methods described herein may be implemented on a wide range of devices, including most Internet-enabled mobile phones and other wireless communication devices. Also, the methods may be implemented using wireless communication devices that do not include dedicated thermal mitigation hardware or specific circuitry. Such a mobile electronic 100 may include a processor platform 180 that may handle and execute software applications. The processor platform 180 includes, among other components, a processor 185 such as an application-specific integrated circuit ("ASIC") or a RISC processor such as those that implement the ARM architecture. The processor 185 or other processor executes an application programming interface ("API") layer 183, which includes the resident application environment, and may include the operating system loaded on the processor 185. The resident application environment interfaces with any resident programs in the memory 181, e.g., a computer readable storage medium of the wireless communication device 100.

The mobile electronic device 100 may be a wireless communication telephone, with a graphics display 101, but may also be any wireless device with a processor platform 180 as known in the art, such as a personal digital assistant (PDA), a pager with a graphics display 101, or even a separate processor platform 180 that has a wireless communication portal, and may otherwise have a wired connection to a network or the Internet. Further, the memory 181 may comprise read-only or random-access memory (RAM and ROM), EPROM, EEPROM, flash cards, or any memory common to processor platforms. The processor platform 180 may also include a local database 189 for storage of software applications not actively used in memory 181. The local database 189 may comprise one or more flash memory cells, but may be any secondary or tertiary storage device as known in the art, such as magnetic media, EPROM, EEPROM, optical media, tape, or soft or hard disk. The graphics display 101 may present information to a user or prompt for user input, as is more fully described herein.

The processor platform 180 may also include a direct communication interface 187 that is configured to open a direct communication channel. The direct communication interface 187 may also be part of the standard communication interface for the mobile electronic device 100. The direct communication interface 187 may comprise hardware as is known in the art. In the various embodiments, the software to enable functionality in the mobile electronic device 100 may be pre-installed in the device during device manufacture. Additionally or alternatively, at least a portion of the software providing functionality may be downloaded to or otherwise installed on the device 100. As yet a further alternative, the software or portions thereof may be a downloadable application (e.g., a mobile app).

Figure 6:
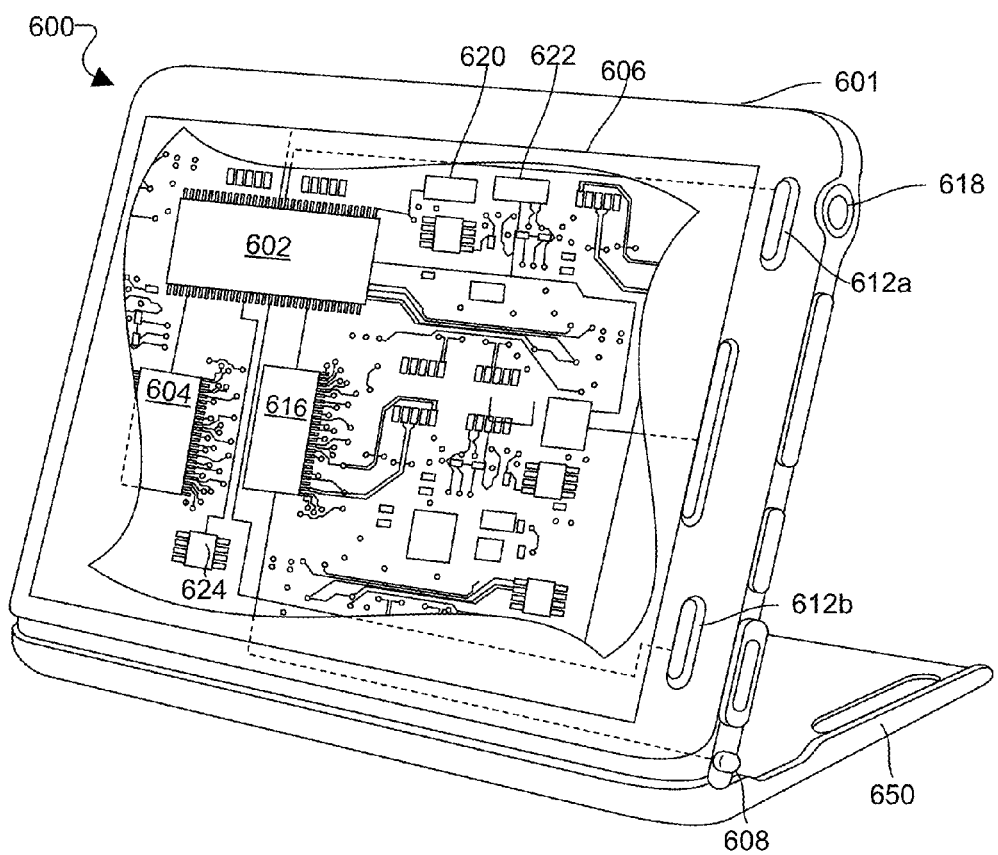
FIG. 6 is a component diagram of an example mobile electronic device suitable for use with the various embodiments.

The various embodiments may be implemented in any of a variety of mobile electronic devices, an example of which is illustrated in FIG. 6. For example, the mobile electronic device 600 may have a permanent outer housing 601 with an add-on outer case 650 attached thereto (shown only partially attached in FIG. 6). Also, the mobile electronic device 600 may include a processor 602 coupled to internal memory 604. Internal memory 604 may be volatile or non-volatile memory, and may also be secure and/or encrypted memory, or unsecure and/or unencrypted memory, or any combination thereof. The processor 602 may also be coupled to a touch screen display 606, such as a resistive-sensing touch screen, capacitive-sensing touch screen infrared sensing touch screen, or the like. Additionally, the display of the mobile electronic device 600 need not have touch screen capability. The display 606 may be incorporated into the permanent outer housing 601. Additionally, the mobile electronic device 600 may have an antenna 608 for sending and receiving electromagnetic radiation that may be connected to a wireless data link and/or cellular telephone transceiver 616 coupled to the processor 602. The mobile electronic device 600 may also include physical buttons 612a and 612b for receiving user inputs. The mobile electronic device 600 may also include a power button 618 for turning the mobile electronic device 600 on and off. Additionally, the mobile electronic device 600 may include one or more temperature sensing circuits 620, such as a thermister, positioned within the device, such as on a circuit board, on or near the battery, and/or coupled to an inside surface of the permanent outer housing 601. Further, the mobile electronic device 600 may include a proximity sensor 622 that is configured to detect the proximity of objects, such as a user's face or add-on case, to the mobile electronic device 600. Alternatively or in addition, the mobile electronic device 600 may include an RFID transceiver 624 configured to communicate with an RFID chip included within an add-on case (not shown).

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc, where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Individual features, elements and/or aspects of the various embodiments described herein may be interchanged between embodiments in all possible combinations, including combination with redundant features, elements or aspects. Also, various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for managing thermal conditions in a mobile electronic device having a front side with a display and a back panel of a permanent outer housing of the mobile electronic device disposed behind the display, comprising:
 determining, in the mobile electronic device, whether an add-on outer case is attached to the back panel, wherein the add-on outer case is removably secured to and covers the permanent outer housing of the mobile electronic device; and changing a thermal mitigation parameter of a thermal mitigation process implemented on the mobile electronic device, to increase a temperature limit that the back panel is allowed to reach before an action is taken to avoid that temperature increasing further, in response to determining that the add-on outer case is attached to the back panel.

2. The method of claim 1, wherein determining whether the add-on outer case is attached to the back panel comprises receiving a user input indicating whether the add-on outer case is attached to the mobile electronic device.

3. The method of claim 2, wherein:
receiving the user input indicating whether the add-on outer case is attached to the mobile electronic device includes receiving the user input of one or more of a case description, a case design, a case identifier, a case thermal insulation factor and a specified thermal mitigation parameter; and changing the thermal mitigation parameter of the thermal mitigation process implemented on the mobile electronic device comprises changing the thermal mitigation parameter based upon the user input.

4. The method of claim 1, wherein determining whether the add-on outer case is attached to the back panel comprises detecting a presence of the add-on outer case by a proximity sensor within the mobile electronic device.

5. The method of claim 4, further comprising:
measuring, in the mobile electronic device, a continuous duration that the presence of the add-on outer case is detected, wherein in response to the continuous duration exceeding a time threshold the add-on outer case is determined to be attached.

6. The method of claim 1, further comprising:
receiving a communication from the add-on outer case, wherein determining whether the add-on outer case is attached to the back panel is based on the communication received from the add-on outer case.

7. The method of claim 6, wherein changing the thermal mitigation parameter of the thermal mitigation process implemented on the mobile electronic device comprises changing the thermal mitigation parameter based on information in the communication received from the add-on outer case.

8. The method of claim 6, further comprising:
receiving, in the communication, identification information from the add-on outer case regarding the add-on outer case; and transmitting a query to a source remote from the mobile electronic device including the identification information regarding the add-on outer case, wherein changing the thermal mitigation parameter of the thermal mitigation process implemented on the mobile electronic device comprises changing the thermal mitigation parameter based on information received in response to transmitting the query.

9. The method of claim 1, further comprising:
detecting, in the mobile electronic device, when the add-on outer case is removed from the mobile electronic device; and changing the thermal mitigation parameter of the thermal mitigation process implemented on the mobile electronic device back to an original value in response to detecting that the add-on outer case has been removed from the mobile electronic device.

10. A mobile electronic device, comprising:
a permanent outer housing of the mobile electronic device having a front side with a display and a back panel of the permanent outer housing disposed behind the display;

a memory within the permanent outer housing; and a processor disposed within the permanent outer housing and coupled to the memory, wherein the processor is configured with processor-executable instructions to perform operations comprising:
determining whether an add-on outer case is attached to the back panel, wherein the add-on outer case is removably secured to and covers the permanent outer housing of the mobile electronic device; and changing a thermal mitigation parameter of a thermal mitigation process implemented on the mobile electronic device, to increase a temperature limit that the back panel is allowed to reach before an action is taken to avoid that temperature increasing further, in response to determining that the add-on outer case is attached to the back panel.

11. The mobile electronic device of claim 10, wherein the processor is configured with processor-executable instructions to perform operations such that determining whether the add-on outer case is attached to the back panel comprises receiving a user input indicating whether the add-on outer case is attached to the mobile electronic device.

12. The mobile electronic device of claim 11, wherein the processor is configured with processor-executable instructions to perform operations such that:
receiving the user input indicating whether the add-on outer case is attached to the mobile electronic device includes receiving the user input of one or more of a case description, a case design, a case identifier, a case thermal insulation factor and a specified thermal mitigation parameter; and changing the thermal mitigation parameter of the thermal mitigation process implemented on the mobile electronic device comprises changing the thermal mitigation parameter based upon the user input.

13. The mobile electronic device of claim 10, wherein the processor is configured with processor-executable instructions to perform operations such that determining whether the add-on outer case is attached to the back panel comprises detecting a presence of the add-on outer case by a proximity sensor within the mobile electronic device.

14. The mobile electronic device of claim 13, wherein the processor is configured with processor-executable instructions to perform operations further comprising measuring a continuous duration the presence of the add-on outer case is detected, wherein in response to the continuous duration exceeding a time threshold the add-on outer case is determined to be attached.

15. The mobile electronic device of claim 10, wherein the processor is configured with processor-executable instructions to perform operations further comprising receiving a communication from the add-on outer case, wherein determining whether the add-on outer case is attached to the back panel is based on the communication received from the add-on outer case.

16. The mobile electronic device of claim 15, wherein the processor is configured with processor-executable instructions to perform operations such that changing the thermal mitigation parameter of the thermal mitigation process implemented on the mobile electronic device comprises changing the thermal mitigation parameter based on information in the communication received from the add-on outer case.

17. The mobile electronic device of claim 15, wherein the processor is configured with processor-executable instructions to perform operations further comprising:
receiving, in the communication, identification information from the add-on outer case regarding the add-on outer case; and
transmitting a query to a source remote from the mobile electronic device including the identification information regarding the add-on outer case,
wherein changing the thermal mitigation parameter of the thermal mitigation process implemented on the mobile electronic device comprises changing the thermal mitigation parameter based on information received in response to transmitting the query.

18. The mobile electronic device of claim 10, wherein the processor is configured with processor-executable instructions to perform operations further comprising:
detecting when the add-on outer case is removed from the mobile electronic device; and
changing the thermal mitigation parameter of the thermal mitigation process implemented on the mobile electronic device back to an original value in response to detecting that the add-on outer case has been removed from the mobile electronic device.

19. A mobile electronic device having a front side with a display and a back panel of a permanent outer housing of the mobile electronic device disposed behind the display, comprising:
means for determining whether an add-on outer case is attached to the back panel, wherein the add-on outer case is removably secured to and covers the permanent outer housing of the mobile electronic device; and
means for changing a thermal mitigation parameter of a thermal mitigation process implemented on the mobile electronic device, to increase a temperature limit that the back panel is allowed to reach before an action is taken to avoid that temperature increasing further, in response to determining that the add-on outer case is attached to the back panel.

20. The mobile electronic device of claim 19, wherein means for determining whether the add-on outer case is attached to the back panel comprises means for receiving a user input indicating whether the add-on outer case is attached to the mobile electronic device.

21. The mobile electronic device of claim 20, wherein:
means for receiving the user input indicating whether the add-on outer case is attached to the mobile electronic device comprises means for receiving the user input of one or more of a case description, a case design, a case identifier, a case thermal insulation factor and a specified thermal mitigation parameter; and
means for changing the thermal mitigation parameter of the thermal mitigation process implemented on the mobile electronic device comprises means for changing the thermal mitigation parameter based upon the user input.

22. The mobile electronic device of claim 19, wherein means for determining whether the add-on outer case is attached to the back panel comprises means for detecting a presence of the add-on outer case by a proximity sensor within the mobile electronic device.

23. The mobile electronic device of claim 22, further comprising:
means for measuring a continuous duration the presence of the add-on outer case is detected; and
means for determining that the add-on outer case is attached in response to the continuous duration exceeding a time threshold.

24. The mobile electronic device of claim 19, further comprising means for receiving a communication from the add-on outer case, wherein means for determining whether the add-on outer case is attached to the back panel comprises means for determining whether the add-on outer case is attached to the mobile electronic device based on the communication received from the add-on outer case.

25. The mobile electronic device of claim 24, wherein means for changing the thermal mitigation parameter of the thermal mitigation process implemented on the mobile electronic device comprises means for changing the thermal mitigation parameter based on information in the communication received from the add-on outer case.

26. The mobile electronic device of claim 24, further comprising:
means for receiving, in the communication, identification information from the add-on outer case regarding the add-on outer case; and
means for transmitting a query to a source remote from the mobile electronic device including the identification information regarding the add-on outer case,
wherein means for changing the thermal mitigation parameter of the thermal mitigation process implemented on the mobile electronic device comprises means for changing the thermal mitigation parameter based on information received in response to transmitting the query.

27. The mobile electronic device of claim 19, further comprising:
means for detecting, in the mobile electronic device, when the add-on outer case is removed from the mobile electronic device; and
means for changing the thermal mitigation parameter of the thermal mitigation process implemented on the back to an original value in response to detecting that the add-on outer case has been removed from the mobile electronic device.

28. A non-transitory processor-readable storage medium having stored thereon processor-executable instructions configured to cause a processor of a mobile electronic device, having a front side with a display and a back panel of a permanent outer housing of the mobile electronic device disposed behind the display, to perform operations comprising:
determining whether an add-on outer case is attached to the back panel, wherein the add-on outer case is removably secured to and covers the permanent outer housing of the mobile electronic device; and
changing a thermal mitigation parameter of a thermal mitigation process implemented on the mobile electronic device, to increase a temperature limit that the back panel is allowed to reach before an action is taken to avoid that temperature increasing further, in response to determining that the add-on outer case is attached to the back panel.

29. The non-transitory processor-readable storage medium of claim 28, wherein the stored processor-executable instructions are configured to cause the processor of the mobile electronic device to perform operations such that determining whether the add-on outer case is attached to the back panel comprises receiving a user input indicating whether the add-on outer case is attached to the mobile electronic device.

30. The non-transitory processor-readable storage medium of claim 29, wherein the stored processor-executable instructions are configured to cause the processor of the mobile electronic device to perform operations such that:
receiving the user input indicating whether the add-on outer case is attached to the mobile electronic device includes receiving the user input of one or more of a case description, a case design, a case identifier, a case thermal insulation factor and a specified thermal mitigation parameter; and
changing the thermal mitigation parameter of the thermal mitigation process implemented on the mobile electronic device comprises changing the thermal mitigation parameter based upon the user input.

31. The non-transitory processor-readable storage medium of claim 28, wherein the stored processor-executable instructions are configured to cause the processor of the mobile electronic device to perform operations such that determining whether the add-on outer case is attached to the back panel comprises detecting a presence of the add-on outer case by a proximity sensor within the mobile electronic device.

32. The non-transitory processor-readable storage medium of claim 31, wherein the stored processor-executable software instructions are configured to cause the processor of the mobile electronic device to perform operations further comprising measuring, in the mobile electronic device, a continuous duration the presence of the add-on outer case is detected, wherein in response to the continuous duration exceeding a time threshold the add-on outer case is determined to be attached.

33. The non-transitory processor-readable storage medium of claim 28, wherein the stored processor-executable software instructions are configured to cause the processor of the mobile electronic device to perform operations further comprising receiving a communication from the add-on outer case, wherein determining whether the add-on outer case is attached to the back panel is based on the communication received from the add-on outer case.

34. The non-transitory processor-readable storage medium of claim 33, wherein the stored processor-executable instructions are configured to cause the processor of the mobile electronic device to perform operations such that changing the thermal mitigation parameter of the thermal mitigation process implemented on the mobile electronic device comprises changing the thermal mitigation parameter based on information in the communication received from the add-on outer case.

35. The non-transitory processor-readable storage medium of claim 33, wherein the stored processor-executable software instructions are configured to cause the processor of the mobile electronic device to perform operations further comprising:
receiving, in the communication, identification information from the add-on outer case regarding the add-on outer case; and
transmitting a query to a source remote from the mobile electronic device including the identification information regarding the add-on outer case,
wherein changing the thermal mitigation parameter of the thermal mitigation process implemented on the mobile electronic device comprises changing the thermal mitigation parameter based on information received in response to transmitting the query.

36. The non-transitory processor-readable storage medium of claim 28, wherein the stored processor-executable software instructions are configured to cause the processor of the mobile electronic device to perform operations further comprising:
detecting when the add-on outer case is removed from the mobile electronic device; and
changing the thermal mitigation parameter of the thermal mitigation process implemented on the mobile electronic device back to an original value in response to detecting that the add-on outer case has been removed from the mobile electronic device.

* * * * *